(12) United States Patent
Eckhardt

(10) Patent No.: US 7,684,126 B2
(45) Date of Patent: Mar. 23, 2010

(54) FRESNEL FIELD LENS

(75) Inventor: Stephen K. Eckhardt, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 598 days.

(21) Appl. No.: 11/611,279

(22) Filed: Dec. 15, 2006

(65) Prior Publication Data

US 2007/0201148 A1    Aug. 30, 2007

Related U.S. Application Data

(60) Provisional application No. 60/743,355, filed on Feb. 24, 2006.

(51) Int. Cl.
  *G02B 3/08* (2006.01)
(52) U.S. Cl. ........................ 359/742; 359/724
(58) Field of Classification Search ............... 359/742, 359/724, 743, 622, 630, 452, 453
  See application file for complete search history.

(56) References Cited

U.S. PATENT DOCUMENTS

| | | | |
|---|---|---|---|
| 540,122 | A | 5/1895 | Taylor |
| 2,117,252 | A | 5/1938 | Lee |
| 5,803,568 | A | 9/1998 | Eckhardt |
| 5,871,653 | A | 2/1999 | Ling |
| 6,046,859 | A | 4/2000 | Raj |
| 6,717,747 | B2 | 4/2004 | Kaneko |
| 6,821,810 | B1 | 11/2004 | Hsiao et al. |
| 7,419,267 | B2 * | 9/2008 | Whitehead et al. ............ 353/30 |
| 7,515,358 | B2 * | 4/2009 | Noda ........................ 359/785 |
| 2006/0054986 | A1 * | 3/2006 | Yu ............................ 257/432 |
| 2006/0209292 | A1 * | 9/2006 | Dowski et al. ............... 356/121 |

FOREIGN PATENT DOCUMENTS

| | | | |
|---|---|---|---|
| FR | 2 826 130 | * | 1/2006 |
| JP | 08-322067 | * | 12/1996 |
| JP | 2002-055273 | | 2/2002 |
| KR | 2002-0083026 | | 11/2002 |

OTHER PUBLICATIONS

Shiono et al., "Computer-controlled electron-beam writing system for thin film micro-optics", *J. Vac. Sci. Technol.* B 5 (1), Jan./Feb. 1987, pp. 33-34.

Shiono et al., "Rectangular-apertured micro-Fresnel lens arrays fabricated by electron-beam lithography", *Applied Optics*, vol. 26, No. 3, Feb. 1, 1987, pp. 587-591.

(Continued)

*Primary Examiner*—Timothy J Thompson
(74) *Attorney, Agent, or Firm*—Dean M. Harts; Yen Tong Florczak

(57) ABSTRACT

Provided is a Fresnel lens for use with an array of semiconductor pixels that are separated by inactive areas, comprising a faceted surface with a plurality of facets for receiving an imaging beam, the facets being arranged into a plurality of zones separated by zone edges, and wherein the zone edges are generally aligned with the inactive areas throughout the array. Also provided are an optical detector and an imaging system incorporating such a Fresnel lens system.

23 Claims, 5 Drawing Sheets

OTHER PUBLICATIONS

Veldkamp et al., "Binary Optics", *Scientific American,* May 1992, pp. 92-97.

Ke et al., "Research on hybrid integration technology between charge-coupled devices and diffractive microlens", *J. Micromech. Microeng.* 14 (2004), pp. 125-128.

Failop Chu, "Improving CMOS image sensor performance with combined pixels", CMP Video/Imaging Design Line, Nov. 21, 2005.

Don Scansen, "CMOS challenges CCD for image-sensing lead", EE Times, Mar. 7, 2005.

Dr. Gerhard Hoist, "Darkness on the Edge of Your Images", *Photonics Spectra,* Jul. 2006, pp. 76-82.

\* cited by examiner

FRESNEL FIELD LENS

RELATED APPLICATION

This application claims priority to U.S. Provisional Application No. 60/743,355 filed on Feb. 24, 2006, the disclosure of which is herein incorporated by reference.

FIELD OF THE INVENTION

The present invention is directed to a Fresnel field lens for an imaging system.

BACKGROUND

Imaging systems, such as those found on cellular phones, are becoming increasingly more common, smaller, and less expensive. As the trend continues toward miniaturization of these imaging systems, it is desirable to maintain a high quality image, even as component sizes and focal lengths shrink.

One problem facing these imaging systems is non-telecentricity, which leads to a decrease in image brightness at the corners, relative to the center of the image.

Accordingly, it would be beneficial to provide telecentricity to the imaging system, without significantly increasing the cost or size of the imaging system.

BRIEF SUMMARY

A Fresnel field lens is disclosed herein for use in close proximity to a sensor array. This lens ensures that the chief ray at the edge of the image strikes the sensor array at near-normal incidence, reducing a drop in brightness at the edge of the image as compared with the center of the image. The sensor array generally has pixels separated by inactive areas. The Fresnel field lens has a plurality of zones separated by zone edges, where the zone edges are generally aligned with the inactive areas of the sensor array. The zone edges can be rectangularly concentric, stepwise approximations of circularly concentric regions, or any other suitable shape. Alignment of the zone edges with the inactive areas on the sensor array reduces the number and severity of blocked pixels on the sensor array, so that there is little superposition of the zone pattern onto the image recorded by the sensor array.

One embodiment of the present invention is a Fresnel lens for use with an array of semiconductor pixels, wherein the pixels are separated by inactive areas, comprising a faceted surface comprising a plurality of facets for receiving an imaging beam, the facets being arranged into a plurality of zones separated by zone edges. The zone edges are generally aligned with the inactive areas throughout the array.

A further embodiment is an optical detector, comprising a pixelated sensor comprising a plurality of pixels separated by inactive areas; and a Fresnel lens being disposed in proximity to the pixelated sensor for receiving an imaging beam, the Fresnel lens having a faceted surface comprising a plurality of facets, the facets being arranged into a plurality of zones separated by zone edges. The zone edges are generally aligned with the inactive areas throughout the array. Such pixilated sensors can comprise a periodic array of pixels in which pixel size is generally uniform and repeated linearly in the case of a rectangular array or radially in the case of a circular array, the periodicity of the array being the repeat distance along the corresponding linear or radial dimension. In a rectangular array of pixels, it is possible to have different periodicities along x and y-axes. In such periodic arrays, it is generally desirable that the Fresnel lens zone dimensions in the respective directions correspond to a multiple of the repeat distance, or periodicity, along the linear dimension, such as to minimize artifacts which might arise were the shadow of a zone edge to fall within a pixel. In some embodiments, the periodicity of the zone may differ from an exact multiple of the periodicity of the sensor to better match optically the periodicity of the array.

A further embodiment is a Fresnel lens for use with an array of semiconductor pixels wherein the pixels are separated by pixel edges, comprising a first surface comprising a plurality of facets for receiving an imaging beam, the facets being arranged into a plurality of zones separated by zone edges. The zone edges are generally aligned with the pixel edges.

A further embodiment is an imaging system having an exit pupil, comprising an array of semiconductor pixels; and a Fresnel lens disposed between the exit pupil and the array of semiconductor pixels, for bending an off-axis light ray emerging from the center of the exit pupil to strike the array of semiconductor pixels at near normal incidence.

DETAILED DESCRIPTION OF ILLUSTRATIVE EMBODIMENTS

As imaging systems become more prevalent in relatively inexpensive devices, such as cellular phones, the trend is to reduce the cost and size of the imaging system, while maintaining a relatively high image quality. This reduction in size includes the focal length and diameter of the camera lens, the footprint and pixel spacing of the sensor chip, and the overall volume envelope dedicated to the optical system. As these dimensions decrease in size, the problem of non-telecentricity becomes more apparent.

Figure 1:
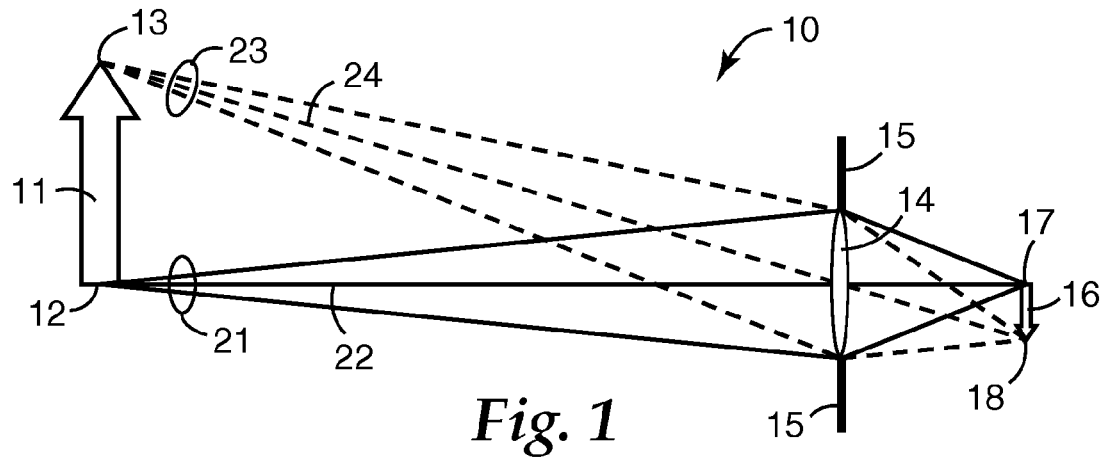
FIG. 1 is a schematic drawing of a non-telecentric imaging system.

In a non-telecentric imaging system, the angle at which a bundle of rays strikes a detector varies across the detector area. For instance, a bundle of rays near the center of the image may strike the detector at near normal incidence, while a bundle of rays near the edge of the detector may strike the detector at a pronounced angle. A generic, non-telecentric imaging system is shown in FIG. 1, in which a lens, exit pupil, and image are contained in a camera unit, and an object is not contained within the camera unit.

In the non-telecentric imaging system 10, light from an object 11 passes through a lens 14 and forms an image 16. The object 11 and image 16 are both drawn schematically as arrows, with a relatively distant, and relatively large object 11 forming a relatively close, and relatively small image 16. The exit pupil 15 in this non-telecentric system is located at or near the lens 14. It is assumed throughout this document that wavefront and chromatic aberrations from this lens 14 do not significantly degrade the image.

Note that any suitable lens 14 may be used. Although a singlet or a doublet may be sufficient for a low-end imaging system, more complicated lenses may be used for systems requiring higher resolution. One such lens is a triplet, disclosed in FIG. 13 of U.S. Pat. No. 540,122, issued May 28, 1895 to Harold Dennis Taylor, and incorporated by reference herein in its entirety. Another such lens is commonly known as a "double Gauss", and is disclosed in Example 1 of U.S. Pat. No. 2,117,252, issued May 10, 1938 to Horace Williams Lee, and incorporated by reference herein in its entirety.

Light emerging from the base 12 of the object 11 forms an on-axis bundle of rays 21, which passes through the lens 14 and converges at the base 17 of the image 16. The central ray 22 in the on-axis bundle of rays 21 passes through the center of the exit pupil 15 and arrives at the image 16 with essentially normal incidence. The other rays in the on-axis bundle arrive in a cone of incident angles, which is roughly centered about normal incidence.

Similarly, light emerging from the edge 13 of the object 11 forms an off-axis bundle of rays 23, which also passes through the lens 14 and converges at the edge 18 of the image 16. The central ray in the off-axis bundle of rays, which passes through the center of the exit pupil 15, is commonly known as a "chief ray". Note that for this non-telecentric imaging system 10, the chief ray 24 arrives at the edge 18 of the object 16 with a finite, non-zero angle of incidence. The other rays in the off-axis bundle also arrive in a cone of incident angles, which is roughly centered about the chief ray's non-zero angle of incidence.

Figure 2:
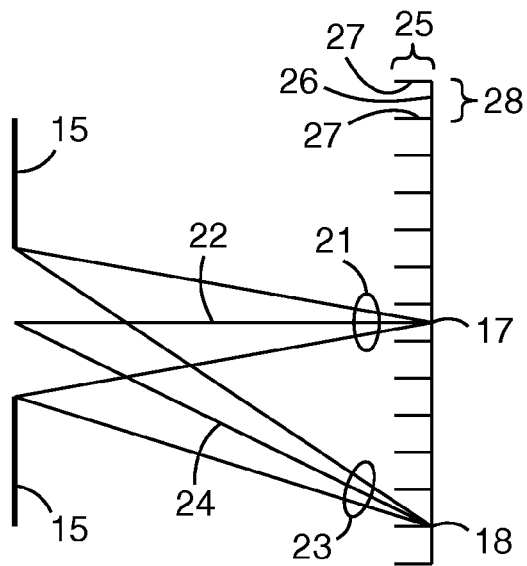
FIG. 2 is a schematic drawing of a portion of the non-telecentric imaging system of FIG. 1.

A problem caused by non-telecentricity is shown in FIG. 2, which depicts a portion of the imaging system of FIG. 1 in greater detail.

Light emerges from the exit pupil 15 and propagates to a sensor array 25. The on-axis bundle of rays 21, with central ray 22, arrives at the base 17 (i.e., center) of the image. Note that the central ray 22 strikes the sensor array 25 at essentially normal incidence. The off-axis bundle of rays 23, with chief ray 24, arrives at the edge 18 of the image. Note that the chief ray 24 strikes the sensor array 25 at a non-zero angle of incidence.

The sensor array 25 may be an array of pixels 28, such as a CCD array or a CMOS array. The pixels 28 in the sensor array 25 are most commonly arranged in a rectilinear fashion, although any suitable arrangement may be used, such as a triangular arrangement, a hexagonal arrangement, or a polar arrangement. Each pixel 28 has an active area 26, which has a light-sensitive surface that can collect incident light and convert it into a suitable electrical signal for the detector electronics. Each pixel 28 also has inactive areas on the side walls of the pixel 28; these inactive areas are typically referred to as "vias" 27, and the vias 27 typically do not convert incident light into an electrical signal for detection. Although the entire rear surface of the pixel 28 is denoted in FIG. 2 as the active area, there may be optional additional inactive areas on the rear surface, such as electrical contacts, mechanical supports, and the like.

As the pixel 28 size is scaled down, it is difficult to also equally scale down the height of the vias. As a result, the presence of the vias becomes more pronounced at small pixel sizes, in that a greater fraction of light undesirably strikes the vias. For example, pixels that are spaced apart by 2 microns or less may have a via height on the order of roughly 1 to 2 microns.

For on-axis locations, near the center 17 of the image, the light strikes the sensor array 25 in a cone centered about essentially normal incidence. As a result, very little of the light strikes the vias. In contrast, for off-axis locations, near the edge 18 of the image, a sizable portion of the light may strike the vias, and may therefore not reach the active area 26 of the pixel. This effect shows up in the image as a reduction in brightness at the edges or corners of the image, compared with the center of the image.

Figure 3:
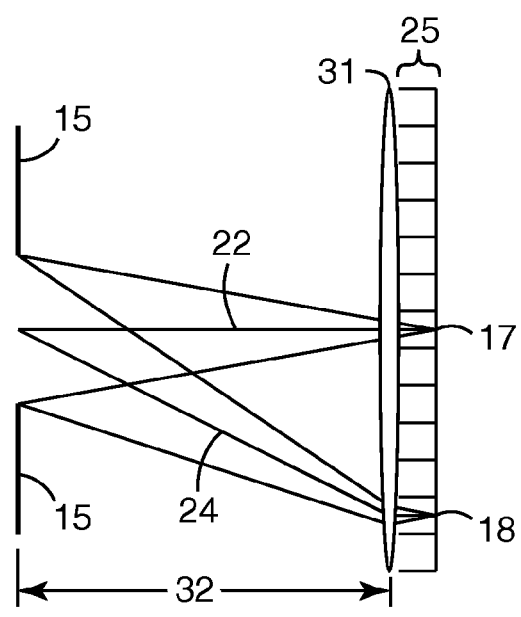
FIG. 3 is a schematic drawing of a telecentric imaging system, with a generic field lens.

One remedy for the loss of brightness at the edge of the image is the insertion of a field lens, at or close to the image at the sensor array. A generic field lens 31 is shown in FIG. 3. The focal length 32 of the field lens 31 is roughly equal to the distance between the exit pupil 15 and the sensor array 25.

In many cases, the focal length 32 of the field lens 31 may be equal to or quite close to the focal length of the camera lens 14. For on-axis points, near the center 17 of the image, the field lens 31 has little effect. However, for off-axis points, near the edge 18 of the image, the field lens 31 redirects the bundle of rays so that the chief ray 24 strikes the sensor array with near normal incidence. In this manner, the field lens 31 ensures that each bundle of rays strikes a pixel at a cone of angles centered around roughly normal incidence, for substantially all locations in the image. As a result, the reductions in brightness caused by the vias 27 are reduced, and an increase in brightness is seen at the corners and edges of the image, relative to the center 17 of the image.

Note that FIG. 3 is not drawn to scale. In reality, the actual distances along the optical axis may be much smaller than those shown in FIG. 3. For instance, although the pixels 28 are shown having an appreciable depth in FIG. 3, the actual pixel depth may be on the order of a few microns or less. In addition, the depth of focus of the imaging system may also be on the order of a few microns or less, so that there may be no significant difference between an imaging beam focused on the front of the pixel, versus on the back of the pixel. In this manner, both the field lens 31 and the sensor array 25 may be considered to be "at" the image, in that any structure in the field lens 31, such as edges or shadowed regions, shows up in the image. In the following paragraphs, which provide more specific examples of the field lens, the field lens may be placed in contact with the sensor array 25, or may be spaced apart slightly from the sensor array 25. In all cases for the purposes of this document, the field lens is arranged so that effects of defocus, caused by propagation from the field lens to the sensor array 25, do not appreciably affect the resulting image. In this manner, the field lens may be said to be sufficiently "close" to the sensor array.

The generic field lens 31 of FIG. 3 is a so-called thin lens, having essentially zero thickness and having principal planes coincident with the lens surface. It will be understood by one of ordinary skill in the art that real lenses may have a finite thickness, and may have principal planes with a finite separation from each other and from the lens surfaces. Several real field lenses are shown in FIGS. 4-6.

Figure 4:
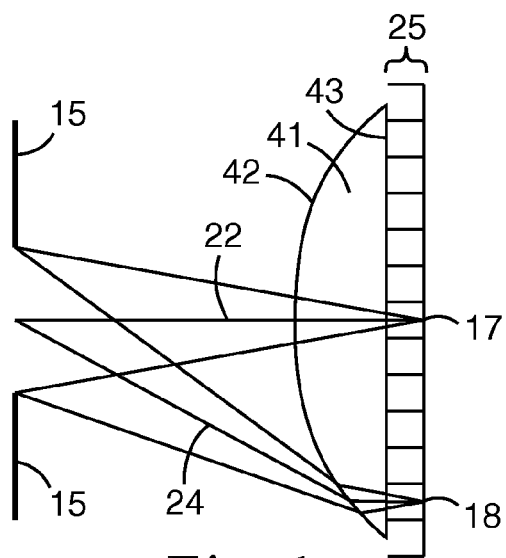
FIG. 4 is a schematic drawing of a telecentric imaging system, with a plano-convex field lens.

FIG. 4 shows a plano-convex field lens 41, with a curved surface 42 facing the incoming beam and a planar surface 43 facing the sensor array 25. The plano-convex field lens 41 may be made from any suitable optical material, such as glass or plastic, having a refractive index denoted by n. For a desired focal length (element 32 in FIG. 3) denoted by f, the radius of curvature of the curved surface 42 should be roughly f×(n−1). The curved surface 42 may be spherical, or may have optional aspheric and/or conic terms in its surface description. In general, an aspheric lens may control telecentricity across the field better than a spherical lens. The planar surface 43 may be flat or essentially planar to within typical manufacturing tolerances, typically on the order of a few microns or less. The planar surface 43 may be in contact with the sensor array 25, or may be spaced apart slightly from the sensor array 25. The space between the planar surface 43 and the sensor array 25 may be filled with a gas (e.g., air), or may be filled by an intermediate optical element, such as a cover glass for the sensor array 25. Typically, the sensor array may be hermetically sealed with a cover glass, with a gas (preferably stable or inert in the system) filling space between the cover glass and the sensor array; the field lens may be located either inside or outside such a cover glass.

One potential shortcoming for a plano-convex field lens 41 is that it may be quite thick, relative to the volume envelope allocated to the imaging system. For instance, the dimensions of the sensor array may be comparable to the required focal length of the field lens, to within a factor of roughly 3, and may require a plano-convex lens that resembles a substantial portion of a hemisphere. Because the curved surface may be a significant distance away from the sensor, the plano-convex field lens 41 may introduce undesirable focusing effects into the beam, which may cause blurring of light among adjacent pixels and, as a result, a loss in resolution. In addition, the plano-convex field lens 41 may be expensive and bulky, relative to the overall cost and volume of the imaging system.

Figure 5:
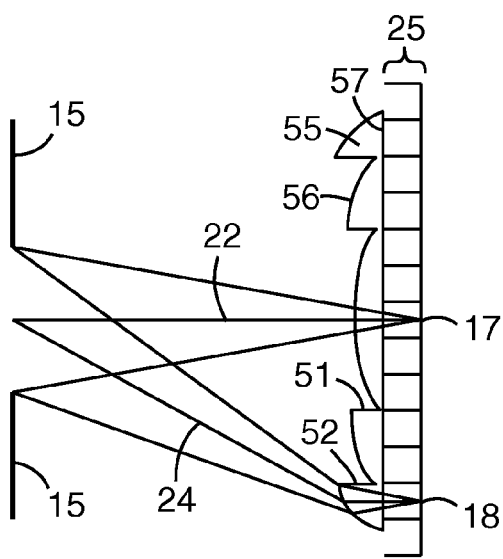
FIG. 5 is a schematic drawing of a telecentric imaging system, with a Fresnel field lens.
Figure 6:
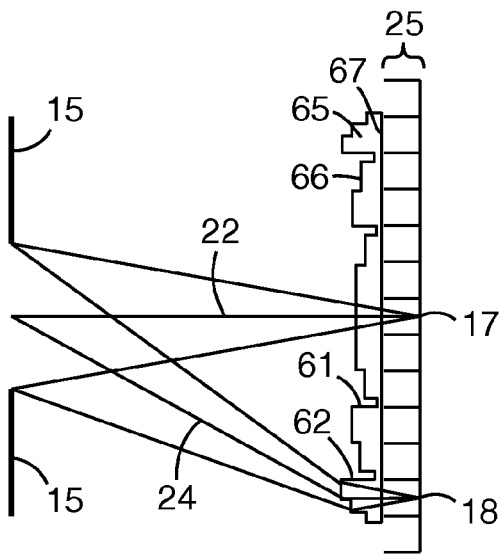
FIG. 6 is a schematic drawing of a telecentric imaging system, with a binary Fresnel field lens.

An alternative to the plano-convex field lens 41 is a Fresnel field lens 55, shown in FIG. 5. The Fresnel field lens 55 approximates the performance of the plano-convex field lens 41, having roughly the same focal length, but with a thinner element. The Fresnel field lens 55 has a faceted surface 56 that has essentially the same local curvature as the curved surface 42 of a comparable plano-convex lens, except at discontinuities that divide the faceted surface 56 into zones. The refractive index of the Fresnel field lens may have any appropriate value, and the focal length may be calculated in a manner analogous to that of the plano-convex field lens 41 presented above. Opposite the faceted surface 56 may be a non-faceted or planar surface 57, which is typically manufactured to be as flat as possible, within typical manufacturing tolerances.

The zone edges 51 and 52 are typically longitudinal discontinuities on the faceted surface 56 that are generally oriented along the optical axis of the lens. Although the zone edges 51 and 52 are commonly made as sharp as possible, there is often some inevitable rounding of the corners that arises during the manufacturing process. This rounding of the corners can degrade the performance of the lens, and it is usually preferable to reduce the rounding as much as possible.

The Fresnel field lens 55 may be made by a mechanical method, such as stamping, molding, or the like, where the fabrication of the curved faceted surface 56 may be relatively straightforward.

The Fresnel field lens may also be made as a photoresist lens, deposited on a relatively thin substrate for support. Such a photoresist lens may be packaged with the sensor behind a protective cover glass. The photoresist may be deposited, exposed and cured, with no etching step required. Suitable materials include, but are not limited to, urethane acrylate, with a refractive index of about 1.49, styrene, with a refractive index of about 1.58, and polymethylmethacrylate (PMMA). It is possible to deposit an anti-reflection coating on either or both surfaces of the Fresnel field lens, and/or on the protective cover glass. Alternatively, it is possible to laminate the Fresnel lens to the cover glass, which may enhance transmission by eliminating two air-glass interfaces.

However, for some fabrication methods, it may prove difficult to create curved surfaces. For instance, conventional lithography exposure techniques are better suited to producing flat surfaces. A binary field lens 65 that can be produced using such flat surface techniques is shown in FIG. 6.

The binary field lens 65 has a faceted surface 66, analogous in function to the faceted surface 56, but with a stepwise approximation to the curvature faceted surface 56. Also shown are zone edges 61 and 62. Each zone is further divided into portions, so that each portion may be fabricated as a flat approximation of the local curved surface height. The portions may be defined during sequential lithographic steps, in which a portion is exposed and, optionally, etched to a particular depth. The steps are repeated for each portion in the zone, until the resulting surface appears as a stepwise approximation to the zone, where the steps are both longitudinal and lateral. The number and placement of the steps is largely a matter of choice for the designer, with a trend being that the closer the approximation to the curved faceted surface 56 of the Fresnel field lens 57, the better the performance. In general, each longitudinal step requires its own set of exposure/etch steps, so the downside of having a large number of steps is that it may increase the expense and time for manufacturing. There is no fundamental limit on the number of steps, beyond the time and expense for manufacturing, so there can be more than one flat step per pixel in the binary Fresnel lens, or one step that subtends several pixels.

It bears emphasizing that for all the field lenses shown in FIGS. 3-6, namely elements 31, 41, 55 and 65, the primary function is to redirect the cones of light on each pixel so that they strike the pixel at a collection of angles centered around near-normal incidence, thereby reducing a drop in brightness at the corners of the image, relative to the center of the image. The field lenses of FIGS. 3-6 do not, in general, direct light from one particular pixel to another pixel, or cause the light to focus in one particular portion of the active region of each pixel. Because the field lenses in FIGS. 3-6 are placed so close to the image, they do not produce a substantial defocusing effect at the image and therefore do not substantially blur the image among adjacent pixels.

The lateral locations of the zone edges 51, 52, 61 and 62 can be determined by various schemes. For instance, one common scheme is to begin a new zone when the surface height (or surface sag) reaches a predetermined value. This results in a series of concentric, circular zones, with each zone having roughly the same surface height. The zones are more closely spaced at the periphery of the lens, compared to the center of the lens. This scheme can produce a Fresnel lens of essentially uniform thickness, with the central zones having essentially the same front-to-back thickness as the outer zones.

A second useful scheme is to provide a constant spacing of zones, from the center of the lens to the periphery. This, too, results in concentric, circular zones, but the surface heights of the peripheral zones are greater than those of the centrally located zones.

Other zone location schemes can combine aspects of the two schemes mentioned above, resulting in concentric, elliptical or substantially circular zones, with varying zone heights and varying zone spacings.

Figure 7:
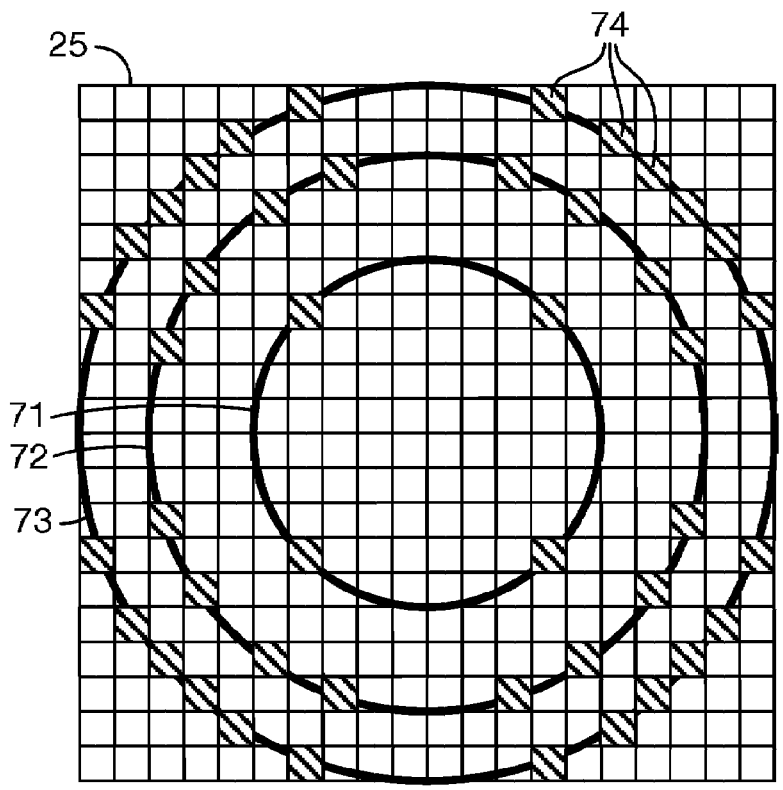
FIG. 7 is a schematic drawing of the zone edges of a circularly symmetric Fresnel field lens, with respect to the location of the inactive areas of an array of pixels.

An exemplary set of circular zone edges 71, 72 and 73 is shown in FIG. 7, superimposed on an exemplary sensor array 25 having pixels laid out in a rectangular fashion. From FIG. 7, it is clear that if circular zones are used with a rectangular array of pixels, then there will inevitably be some blocked pixels 74 for which a zone edge crosses close to the center of the pixel. For these blocked pixels 74, there may be a shadowing effect caused by the finite width of the zone edge, leading to a decrease in brightness. Overall, the sensor array 25 may produce an image having faint outlines of the zone edges superimposed on it, caused by a decreased brightness from these blocked pixels 74.

Note that in many applications of Fresnel lenses, the zone edges are typically not at the same conjugates as the actual image; they are usually out of focus with respect to the images, leading to a blur of the edges caused by defocus. When used in these common applications, the zone patterns of the Fresnel lenses are sufficiently washed out at the image, and there is no significant shadowing effect caused by the zone edges. However, when used as field lenses, these Fresnel lenses are at essentially the same conjugates as the image, where the zone edges may produce shadowing effects that may not be readily seen in other applications.

Figure 8:
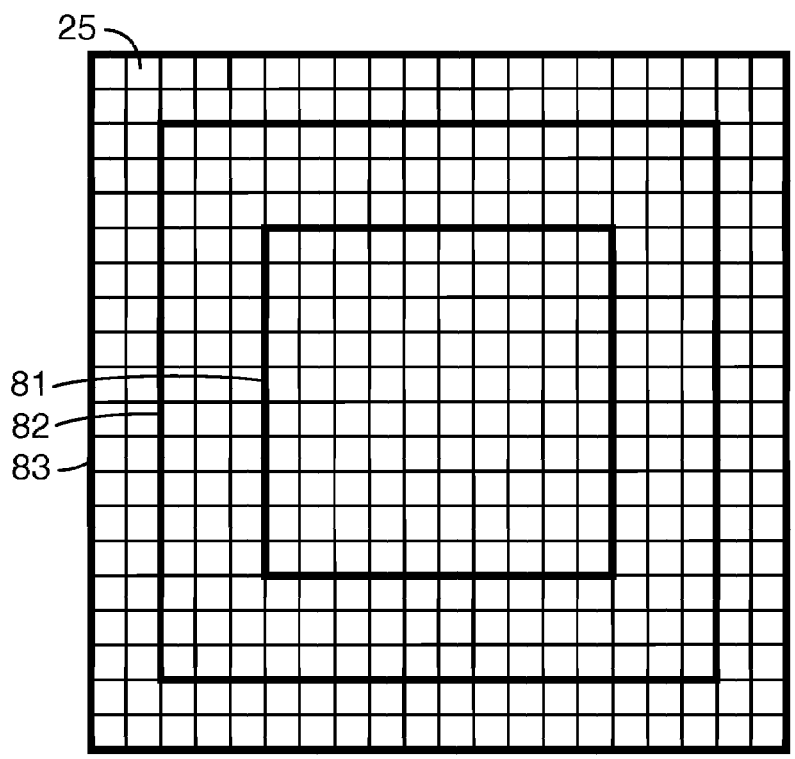
FIG. 8 is a schematic drawing of the zone edges of a Fresnel field lens with concentric rectangular zones, with respect to the location of the inactive areas of an array of pixels.

An exemplary Fresnel lens that can minimize or avoid producing blocked pixels has zone edges 81, 82 and 83 that are concentric rectangular regions, such as squares, as shown in the embodiment of FIG. 8. Here, if the zone edges produce any shadowing effects, the shadows are targeted to fall in the inactive areas between pixels in the sensor array 25 and are not seen in the image produced by the sensor array 25.

Unlike the circular zone edges shown in FIG. 7, the rectangular zone edges produce zones that can have a height that varies azimuthally. For instance, using the notation of a clock-face, the height at the edge of the zone at 12:00, 3:00, 6:00 and 9:00 may be different from the height at the edge of the zone at 1:30, 4:30, 7:30 and 10:30. A zone edge pattern that can reduce this azimuthal height dependence is shown in FIG. 9.

Figure 9:
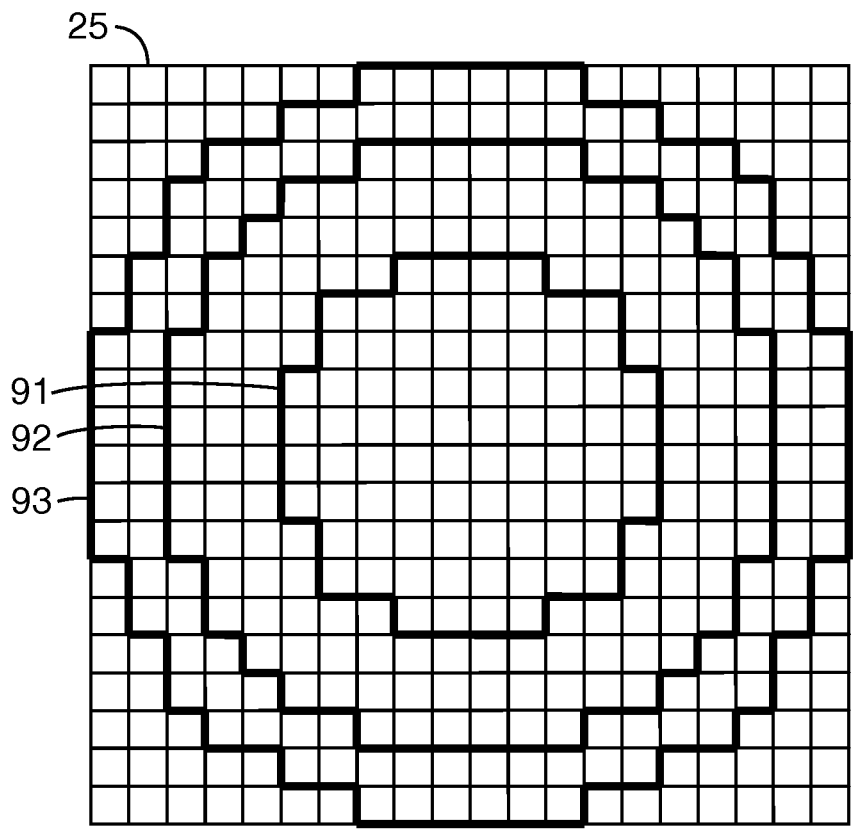
FIG. 9 is a schematic drawing of the zone edges of a Fresnel field lens with zones arranged as stepwise approximations of circles, with respect to the location of the inactive areas of an array of pixels.

In FIG. 9, the zone edges 91, 92 and 93 follow the inactive areas of the sensor array 25, and are shaped in a laterally stepwise approximation of concentric circles. Compared with the circular zone edges 71, 72 and 73 of FIG. 7, the stepwise zone edges 91, 92 and 93 minimize or avoid blocked pixels, such as the blocked pixels 74 in FIG. 7.

Although FIGS. 7-9 are schematics and show only three zones and twenty pixels along a side of the sensor array 25, many more zones and pixels may be used. In practice, a sensor array may have 1000 or more pixels on a side, and a field lens may have possibly 100 or more zones. One of ordinary skill in the art may readily extend the principle of aligning the zone edges with the inactive areas to an arbitrary large number of zones and pixels, as well as arbitrarily shaped and sized pixel layouts.

Figure 10:
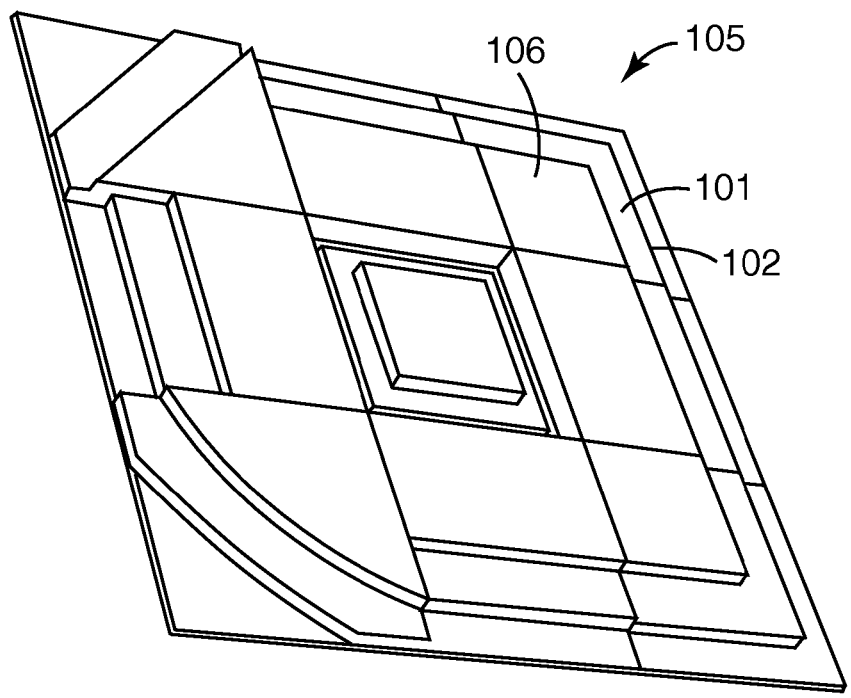
FIG. 10 is a plan drawing of a binary field lens.

FIG. 10 shows a binary field lens 105, having a faceted surface 106 and a non-faceted surface opposite the faceted surface 106. This lens 105 is for use with a twelve-by-twelve pixel sensor array (not shown) that is placed close to or essentially in contact with the non-faceted surface.

The exemplary lens 105 has four zones. The innermost zone subtends a 4-by-4 pixel square at the center of the lens, and the other three zones subtend less regular shapes, outward to the periphery of the lens 105. The zone edges 101 and 102 are aligned with the inactive areas of the sensor array, which can lie between the active areas of the pixels.

Note that the zones may optionally contain discontinuous areas. For instance, zone 118 in FIG. 11 contains several discontinuities. If the binary field lens is made by lithographic techniques any difficulties with a discontinuity in the zone can be minimized.

Note also that portions of the zone edges may not be truly rectilinear. For instance, the triangular and slightly curved portions of the zones at the leftmost edge of FIG. 10 have zone edges that do not lie entirely on a rectangular grid. The curved portions of these zone edges are sufficiently distant from the center of the pixels so that shadowing or blockage from these edges does not occur significantly.

For all the lenses discussed thus far, and shown in FIGS. 1-10, the lens is placed at or in close proximity to the image sensor array. There is no substantial change in focus of the beam between the curved or faceted surface of these field lenses and the active areas of the pixels. However, there may be cases when it desirable to deliberately induce a focusing effect from the lens to the pixels, and an exemplary lens that does just that is shown in FIG. 11.

Figure 11:
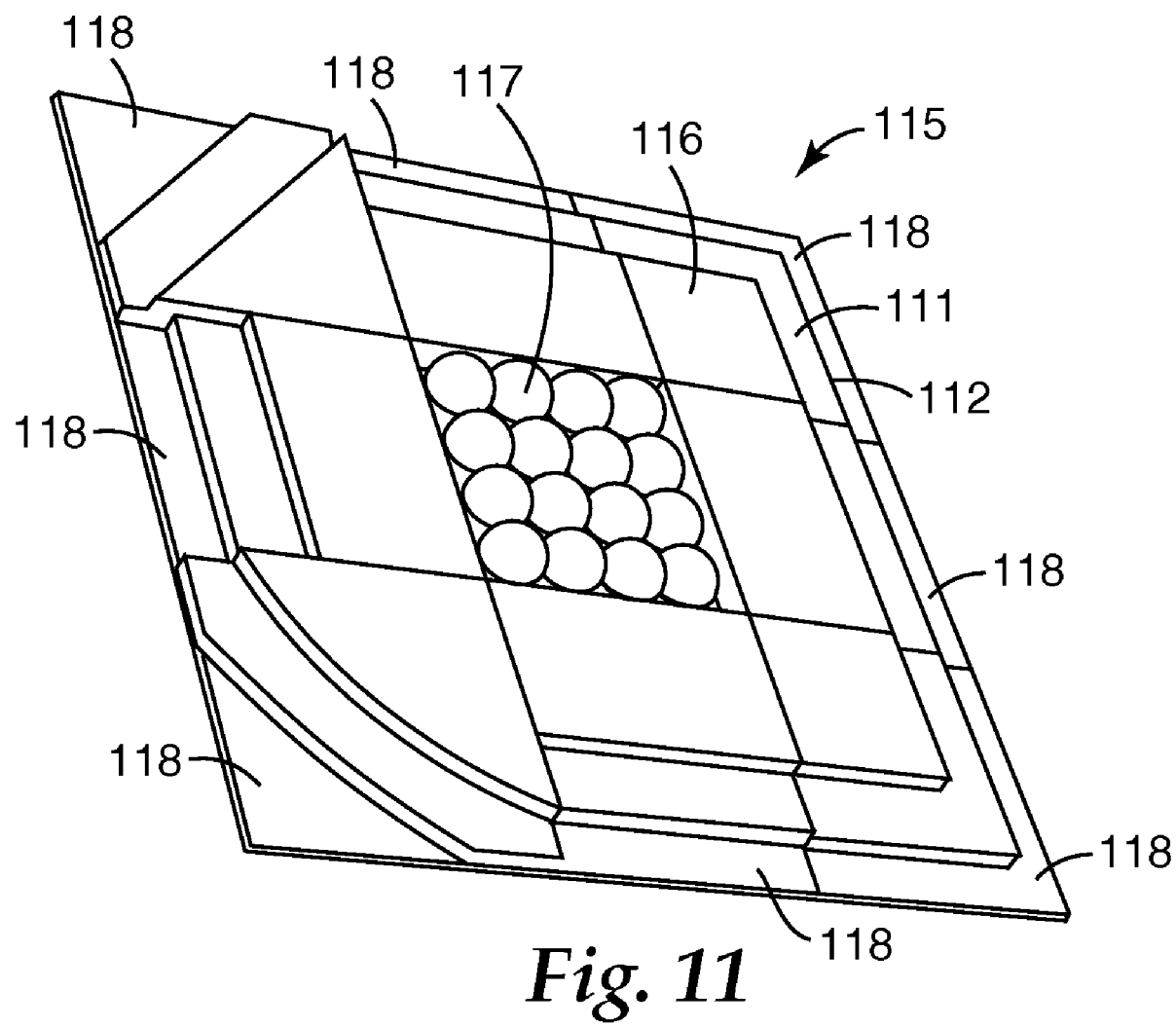
FIG. 11 is a plan drawing of a binary field lens containing microlenses.

FIG. 11 shows a binary field lens 115 that contains microlenses 117 on its faceted surface 116, in addition to the zones 111 and zone edges 112. The microlenses 117 may be arranged with one microlens per pixel in this embodiment, with a focal length short enough to cause a substantial focusing effect from the microlens itself to the active area of the pixel.

The primary function of each of these microlenses is to direct the light incident on a particular pixel away from any inactive areas in the pixel. For instance, consider the case of a particular corner in a pixel having reduced sensitivity, caused by a pixel feature, such as a transistor or capacitor. In the absence of a microlens, a fraction of the beam would normally strike that particular corner, resulting in a reduced efficiency in that pixel. To correct for this systematic inefficiency, a microlens captures all or most of the light that would normally strike a pixel, and concentrates it onto a more efficient location in the pixel, such as away from particularly inefficient features. In general, the microlens does not direct light from one pixel to another; it merely locally redistributes the light hitting each pixel, on a pixel-by-pixel basis.

The microlenses 117 may occupy all or a portion of the faceted surface 116 of the field lens. In the example of FIG. 11, the microlenses are located in the central zone of the field lens, although they may be located on any or all of the field lens faceted surface. In general, the microlenses may be superimposed onto the zone structure of the field lens, with the zones taking on a more coarse structure and subtending several pixels, and the microlenses taking on a more fine structure and subtending only one pixel per microlens.

The focal length of the microlenses 117 can vary over a fairly wide range without substantially affecting the efficiency of the sensor. If the intent of the microlens is to redistribute the light incident on each pixel, so that light is directed away from particular inefficient features, then the beam may be brought partially to focus, exactly to focus, or even past focus, as long as the focused beam does not substantially overlap with the inefficient feature in the pixel.

As a result of this relatively wide range of acceptable focal lengths, the tolerances on the required surface profile of each microlens are relatively loose. The microlenses may therefore be manufactured by a less expensive or less time-consuming process than if the surface profile were critical. For instance, the microlenses may be manufactured by a reflow process, in which little bumps of flowable lens material are formed by photolithography, then the flowable material is heated until it flows under the influence of surface tension and forms a lens-like shape. In this manner, the microlenses may be manufactured at the wafer level, which is relatively fast and inexpensive.

Note that the mere use of microlenses, without a field lens, does not solve the problem of reduced brightness at the corners of the image. For an array of microlenses, with each microlens centered above each pixel, a chief ray propagating at a particular angle from the exit pupil still arrives at the active area of the pixel at that same particular angle. If anything, the array of centered microlenses may exacerbate the drop in brightness at the edge of the image, because the light incident on a pixel may be more tightly concentrated onto an inactive feature, such as the via.

Features can be included into the Fresnel field lens design for the purpose of mechanically aligning the lens with the image sensor array. In addition, the lens alignment in the present invention can be based upon an optical alignment in combination with, or separate from, a geometric or mechanical alignment. For example, the zone edges can be positioned such that any shadow or distortion of the image due to zone edges substantially falls in the inactive regions of the sensor array.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

What is claimed is:

1. A Fresnel lens for use with an array of semiconductor pixels wherein the pixels are separated by inactive areas, comprising:
    a faceted surface comprising a plurality of facets for receiving an imaging beam formed by an imaging system having an exit pupil, the facets being arranged into a plurality of zones separated by zone edges;
    wherein the zone edges are generally aligned with the inactive areas, and wherein the Fresnel lens has a focal length roughly equal to the separation between the Fresnel lens and the exit pupil.

2. The Fresnel lens of claim 1, wherein the imaging beam forms an image; and wherein the Fresnel lens is located roughly at the image.

3. The Fresnel lens of claim 1, wherein the Fresnel lens is located in close proximity to the array of semiconductor pixels.

4. The Fresnel lens of claim 1, wherein the plurality of facets is a stepwise approximation of a generalized asphere.

5. The Fresnel lens of claim 4, wherein the plurality of facets is a stepwise approximation of a spherical surface.

6. The Fresnel lens of claim 1, wherein the zone edges are arranged as concentric rectangular regions or concentric squares.

7. The Fresnel lens of claim 1, wherein the zone edges are arranged as concentric, laterally stepwise approximations of circles.

8. The Fresnel lens of claim 1, further comprising a plurality of microlenses disposed on the faceted surface within a portion of at least one of the zones.

9. The Fresnel lens of claim 8, wherein the microlenses in at least a portion of at least one zone are arranged with one lens per pixel.

10. The Fresnel lens of claim 9, wherein one of the zones is centrally located; and wherein the microlenses are further disposed within the centrally located zone.

11. An optical detector, comprising:
    a pixelated sensor comprising a plurality of pixels separated by inactive areas; and
    a Fresnel lens being disposed in proximity to the pixelated sensor for receiving an imaging beam, the Fresnel lens having a faceted surface comprising a plurality of facets, the facets being arranged into a plurality of zones separated by zone edges;
    wherein the zone edges are generally aligned with the inactive areas throughout the array.

12. The optical detector of claim 11, wherein the Fresnel lens has a second surface opposite the faceted surface, the second surface facing toward the pixelated sensor, and the faceted surface facing away from the pixelated sensor.

13. The optical detector of claim 12, wherein the second surface is essentially planar.

14. The optical detector of claim 11, wherein the Fresnel lens is mounted directly to the pixelated sensor.

15. The optical detector of claim 11, wherein the Fresnel lens is spaced away from the pixelated sensor.

16. An imaging system having an exit pupil, comprising:
    an array of semiconductor pixels, wherein the array of semiconductor pixels includes inactive areas that separate the pixels; and
    a Fresnel lens disposed between the exit pupil and the array of semiconductor pixels, for bending an off-axis light ray emerging from the center of the exit pupil to strike the array of semiconductor pixels at near normal incidence, wherein the Fresnel lens includes a plurality of zones separated by zone edges, and wherein the zone edges are generally aligned with the inactive areas.

17. The imaging system of claim 16, wherein the Fresnel lens is in close proximity to the array of semiconductor pixels.

18. The imaging system of claim 17, wherein the Fresnel lens has a focal length roughly equal to the separation between the exit pupil and the Fresnel lens.

19. The imaging system of claim 16, wherein the zones are substantially concentric and include a central zone.

20. The imaging system of claim 19, wherein the central zone includes a plurality of microlenses; and wherein one or more of the microlenses is arranged with one lens per pixel.

21. The imaging system of claim 20, wherein each of the pixels respectively comprises an active portion and an inactive portion; and wherein the microlenses are arranged with one lens disposed over each pixel for directing light onto the active portions.

22. The imaging system of claim 16, wherein the array of semiconductor pixels has a periodicity; and wherein the zone edges are arranged to match the periodicity of the array of semiconductor pixels.

23. The imaging system of claim 22, wherein the periodicity of the array of semiconductor pixels is rectangular; and wherein the zone edges are rectangular.

* * * * *